United States Patent Office 3,647,594
Patented Mar. 7, 1972

3,647,594
PROCESS FOR PRODUCING ARTIFICIAL
LEATHER
Ernst Demme, Theodor Schachowskoy, Guenther Schuhmacher, and Juergen Fehlhaber, Weinheim, and Ludwig Hartmann, Ober-Flockenbach, Germany, assignors to Carl Freudenberg Kommanditgesellschaft, Weinheim, Germany
No Drawing. Continuation of application Ser. No. 405,292, Oct. 20, 1964. This application Jan. 20, 1970, Ser. No. 4,436
Claims priority, application Germany, Oct. 4, 1963, P 15 60 774.6
Int. Cl. B32b 5/16, 5/22
U.S. Cl. 156—306                                 16 Claims

ABSTRACT OF THE DISCLOSURE

Process of producing artificial leather by applying a fusible cobweb fabric on to the major surface of a nonwoven fabric substrate and then laminating the cobweb to the base fabric by heat and pressure.

---

This application is a continuation of application Ser. No. 405,292, filed Oct. 20, 1964, now abandoned.

This invention relates to, for example, an artificial leather which is particularly resistant to abrasion and buckling by reason of a particular surface treatment to which the material is subjected. Surface structures other than artificial leather may be improved in accordance with the invention. The invention is explained in detail, however, on the basis of the production of artificial leather resistant to abrasion and buckling.

It is known to produce artificial leather by coating the surface of a fabric or fleece with a film. Further, covered layers can be provided by spreading suitable plastic solutions or plastic pastes onto base material. These processes, however, have the disadvantage, that the unevenness existing in the base is imparted to the finished surface, or that in order to obtain good bonding of, for example, the film with the base, intermediate layers must be applied which unfavorably influence the properties of the end-product with respect to feel. However, smooth and well covered surfaces are obtained, in accordance with the invention by laying fine fabrics, knits, or cobweb-like structures on the base. Such structures can be produced, for example, by carding, or blowing of fusible plastics, or by spinning in an electric field. The fine structure is laid on the base, which can be, for example, a fiber fleece in which the fibers are bonded with one another at the crossing points or are joined through a binding agent, and the fine structure is then joined with the base by application of pressure and heat.

In this manner, there is obtained a more or less strong merger of the individual fibers to a more or less closed surface, wherein the permeability of the layer is controllable through adjustment in pressure and heat. Fabrics or knits or the like of fusible plastic fibers, for example, of polyurethane fibers, polyamide fibers, or polyethylene, polypropylene, or PVC (polyvinylchloride) fibers are well suited for the purposes of the invention.

A particular advantage of the process here described resides in that water vapor permeable coatings are obtainable through variation of pressure and heat. Thus, it is possible to produce water vapor permeable layers on fabric bases or impregnated fleeces, and to provide artificial leathers and the like which can be selectively made more or less water permeable.

In the pressing of the cobweb-like or other fine surface structures, depending on the properties of the synthetic material used, pressure between about 5 and 100 kg./cm.$^2$ and temperature between about 100° and 180° is used. At low pressure, high temperature is used and at high pressure low temperature. The synthetic fiber fleeces have a weight of about 50–600 g./m.$^2$, preferably about 300 g./m.$^2$.

For the control of the pore structure, the overlying fleece may, before the pressing, be powdered with cork powder, wood meal, leather dust, colloidal silicic acid or other absorptive materials. These materials become embedded in the overlayer and facilitate water vapor transfer. Alternatively or in addition, permeability to water vapor may be obtained by sprinkling the fine fibrous surface structures with particles soluble in water or other solvents, such as salt crystals, carboxymethylcellulose, and the like, and then dissolving out the same after the pressing. Also, the fiber fleeces can be sprayed or impregnated with solutions of crystalline or colloidal materials, and such materials can then be dissolved out after the pressing. In this working the solvents must not dissolve the synthetic material forming the fine fiber structure or the base structure.

The invention is further described in the following examples.

EXAMPLE 1

By blowing a melt of polyurethane (Estane of Goodrich), which is not cross-linked and is as straight chained as possible, there is produced a fine, tangled fiber fleece of 200 g./m.$^2$. This surface structure is laid on a needled polyamide fiber fleece impregnated with polyurethane. This layer structure is then pressed at a temperature of 145° C. and a pressure of 50 kg./cm.$^2$. The product has a smooth and uniformly covered surface structure and has a water vapor permeability of 1.0 mg. water/cm.$^2$/hour (according to Mitton).

EXAMPLE 2

A fine structure polyurethane fiber fleece, produced as in Example 1, is laid on an impregnated polyamide, polyurethane base fleece as used in Example 1. The fine structure fiber fleece is then sprinkled with 450 mg./m.$^2$ carboxymethylcellulose powder. It is then pressed as under Example 1 and subsequently washed for 17 hours in running tap water and one hour in distilled water. After drying, the water vapor permeability of the product, according to Mitton, is about 5 mg./cm.$^2$/hour.

EXAMPLE 3

A fine structure polyurethane fiber fleece as used in Example 1 is laid onto a base fabric as used in Example 1. Then 500 mg./cm.$^2$ NaCl are sprinkled on and the combination is then pressed as in Example 1. After two hours of washing in running tap water and subsequent rinsing for one hour in distilled water and drying, the product has a water vapor permeability of about 3 mg./cm.$^2$/hour, measured according to the method of Mitton.

EXAMPLE 4

A cobweb-like structure of PVC (polyvinylchloride) fibers, which weighs about 80 g./m.$^2$, is laid onto a fleece consisting of polyamide fibers bonded with a polyurethane adduct and pressed at 160° C. and a pressure of 10 kg./cm.$^2$ for 5 minutes. A surface structure is formed with a smooth homogeneous surface.

EXAMPLE 5

A cobweb-like structure of PVC-fibers having a weight of 80 g./m.$^2$ is sprayed with DOP (dioctylphthalate) or impregnated in DOP until softener in amounts of 40% of the weight of the original PVC structure is taken up. Thereafter the softener-containing PVC structure is laid on a fleece, as described in Example 4, and pressed under the conditions of that example. A product with smooth elastic surface is formed.

Thus, the invention provides a process for production of pliable sheet material having a surface resistant to abrasion and being resistant to buckling. According to the invention, a fine, relatively fusible, and preferably relatively light fabric is laid on a relatively infusible, preferably relatively heavy based fabric to provide a laminate of such fabrics. Heat and pressure is then applied to the laminate to fuse the fine fabric, bond it to the base fabric, and form it into a smooth covering for the base fabric having the desired high resistance to abrasion.

The fine fabric is preferably a thermoplastic material, and can be a non-woven fleece, for example a non-woven fleece having a weight of about 50–600 g./m.$^2$. The base fabric can be a knit, woven, or a non-woven fleece. It has relatively high water vapor permeability. Preferably the base fabric is a non-woven fleece. The base fabric can be of any suitable weight having regard for providing in the product the desired resistance to buckling and product weight.

A feature of the sheet material of the invention is its water vapor permeability. This property of the material can be further improved by dispersing solid particles resistant to the heating and pressing utilized in forming the product on the fine fabric, either by dispersing the solid particles over the upper surface of the fine fabric or between the fine fabric and the base fabric or, if desired, by dispersing the solid particles in the fine fabric. The solid particles then become embedded in the smooth covering upon the application of heat and pressure. The embedded particles are then removed from the product. Hereby, the water vapor permeability is improved.

What is claimed is:

1. Process for coating nonwoven base fabric in which the fibers are bonded together with a bonding agent with a smooth flexible abrasion resistant coating having a permeability similar to natural leather comprising:
    (a) laying a fine fusible cobweb-like fine fiber structure onto the base fabric to provide a laminate,
    (b) heating and pressing the laminate to such an extent that the cobweb-like fine fiber structure fuses into a smooth film having a permeability similar to natural leather.

2. Process according to claim 1, the Mitton water vapor permeability being about 1–5 mg. water/cm.$^2$/hour.

3. Process for production of artificial leather composed of a nonwoven base fabric having a surface coating having properties of natural leather, said surface being smooth, resistant to abrasion and resistant to buckling, which comprises:
    (a) laying a fine, fusible cobweb-like fine fabric structure on the base fabric to provide a laminate of said fabric, the base fabric having the fibers thereof bonded together with a bonding agent,
    (b) heating and pressing the laminate to fuse the cobweb into a smooth and uniform porous surface structure, and bond it to the base fabric.

4. Process according to claim 3, wherein the cobweb-like fine fabric structure is thermoplastic.

5. Process according to claim 3, said cobweb-like fine fabric structure being relatively light and said base fabric being relatively heavy.

6. Process according to claim 5, wherein the cobweb-like fine fabric structure is thermoplastic.

7. Process according to claim 5, wherein the cobweb-like fine fabric structure weighs about 50–600 g./m.$^2$.

8. Process according to claim 7, wherein the cobweb-like fine fabric structure is selected from the group consisting of polyurethane, polyamide, polyethylene, polypropylene and polyvinylchloride fibers.

9. Process according to claim 3, wherein water vapor permeability of the sheet material is controlled by controlling of the heating and pressing to provide a Mitton water vapor permeability of about 1–5 mg. water/cm.$^2$/hour.

10. Process according to claim 3, wherein prior to said heating and pressing, solid particles, resistant to the heating and pressing are dispersed on the cobweb-like fine fabric structure, said particles becoming embedded in the smooth surface formed by the heating and pressing, and wherein following the heating and pressing, the said particles are removed from the product, whereby improved water vapor permeability is imparted to the product.

11. Process according to claim 10, wherein said solid particles are water soluble and are dissolved from the product with water.

12. Process according to claim 11 wherein said solid particles are inorganic salt.

13. Process according to claim 11 wherein said solid particles are of material selected from the group consisting of carboxymethylcellulose and sodium chloride.

14. Process according to claim 3, said surface being permeable to water vapor as leather is permeable to water vapor.

15. Process according to claim 3, the base fabric being a polyamide fiber fleece bonded with polyurethane.

16. Process according to claim 15, wherein the cobweb-like fine fabric structure is selected from the group consisting of polyurethane, polyamide, polyethylene, polypropylene and polyvinylchloride fibers.

References Cited

UNITED STATES PATENTS

| | | | |
|---|---|---|---|
| 2,663,663 | 12/1953 | Weltman et al. | 161—158 X |
| 2,765,247 | 10/1956 | Graham | 161—156 X |
| 2,983,960 | 5/1961 | Jilge | 161—155 X |
| 3,047,444 | 7/1962 | Harwood | 161—152 X |
| 3,255,061 | 6/1966 | Dobbs | 161—Art. L. |
| 3,509,009 | 4/1970 | Hartmann | 161—150 |
| 2,657,391 | 11/1953 | Crandon | 161—152 X |

FOREIGN PATENTS

| | | |
|---|---|---|
| 896,402 | 11/1953 | Germany. |

ROBERT F. BURNETT, Primary Examiner

M. A. LITMAN, Assistant Examiner

U.S. Cl. X.R.

161—150, 156, 157, 164, Dig. 2; 156—155